United States Patent [19]
Midland et al.

[11] 3,930,118
[45] Dec. 30, 1975

[54] RADAR RECORDER SYSTEM

[75] Inventors: Richard W. Midland, Arlington Heights; George S. Bayer, Long Grove; Keith H. Kreiger, Maywood, all of Ill.

[73] Assignee: General Time Corporation, Thomaston, Conn.

[22] Filed: Apr. 24, 1973

(Under Rule 47)

[21] Appl. No.: 353,985

[52] U.S. Cl............. 178/6.7 R; 178/6.7 A; 178/7.4; 343/5 PC
[51] Int. Cl.² ........................ G01S 9/02; H04N 5/88
[58] Field of Search............... 178/6.7 R, 6.7 A, 7.4, 178/7.83, 7.84, 7.87, 7.88, 7.89, DIG. 20, DIG. 28; 343/5 PC

[56] References Cited
UNITED STATES PATENTS

| | | | |
|---|---|---|---|
| 2,470,912 | 5/1949 | Best et al............................ | 178/7.87 |
| 2,853,761 | 9/1958 | Freedman et al.................. | 178/7.88 |
| 3,047,870 | 7/1962 | Bousky ............................. | 178/6.7 A |
| 3,165,024 | 1/1965 | McClure............................ | 343/5 PC |
| 3,278,680 | 10/1966 | Hummel ....................... | 178/DIG. 20 |
| 3,335,219 | 8/1967 | Goldmark et al................ | 178/6.7 A |
| 3,354,342 | 11/1967 | Ohntrup....................... | 179/100.3 Z |
| 3,581,134 | 5/1971 | Johnson............................. | 178/7.87 |

OTHER PUBLICATIONS
Photo–projection of C R Displays, British Communication and Electronics, Apr. 1958, p. 257.

*Primary Examiner*—Raymond F. Cardillo, Jr.
*Attorney, Agent, or Firm*—Pennie & Edmonds

[57] ABSTRACT

A radar recorder system is disclosed for recording and playing back information for a radar system. A motion picture camera is positioned opposite the face of the cathode ray tube (CRT) and is stepped in synchronism with the display on the tube each time the radar sweep passes a reference such as true North. Thus, once each scan of the radar beam, a picture of the corresponding CRT display is taken by the camera. A coder is provided for directing onto a portion of the exposed film information such as time, location, and other information for identifying each frame of the film. A video phototube and video preamplifier are provided for replaying the information stored on the film. In a manner similar to a flying-spot scanner, the cathode ray tube scans across the film in the camera with the light passing through the film being received by the video phototube which converts the sensed light to an electronic signal which then may be replayed on a PPI display. In the replay mode, the camera is stepped under the control of a digital computer so that selected frames of the film may be displayed for varying intervals.

2 Claims, 1 Drawing Figure

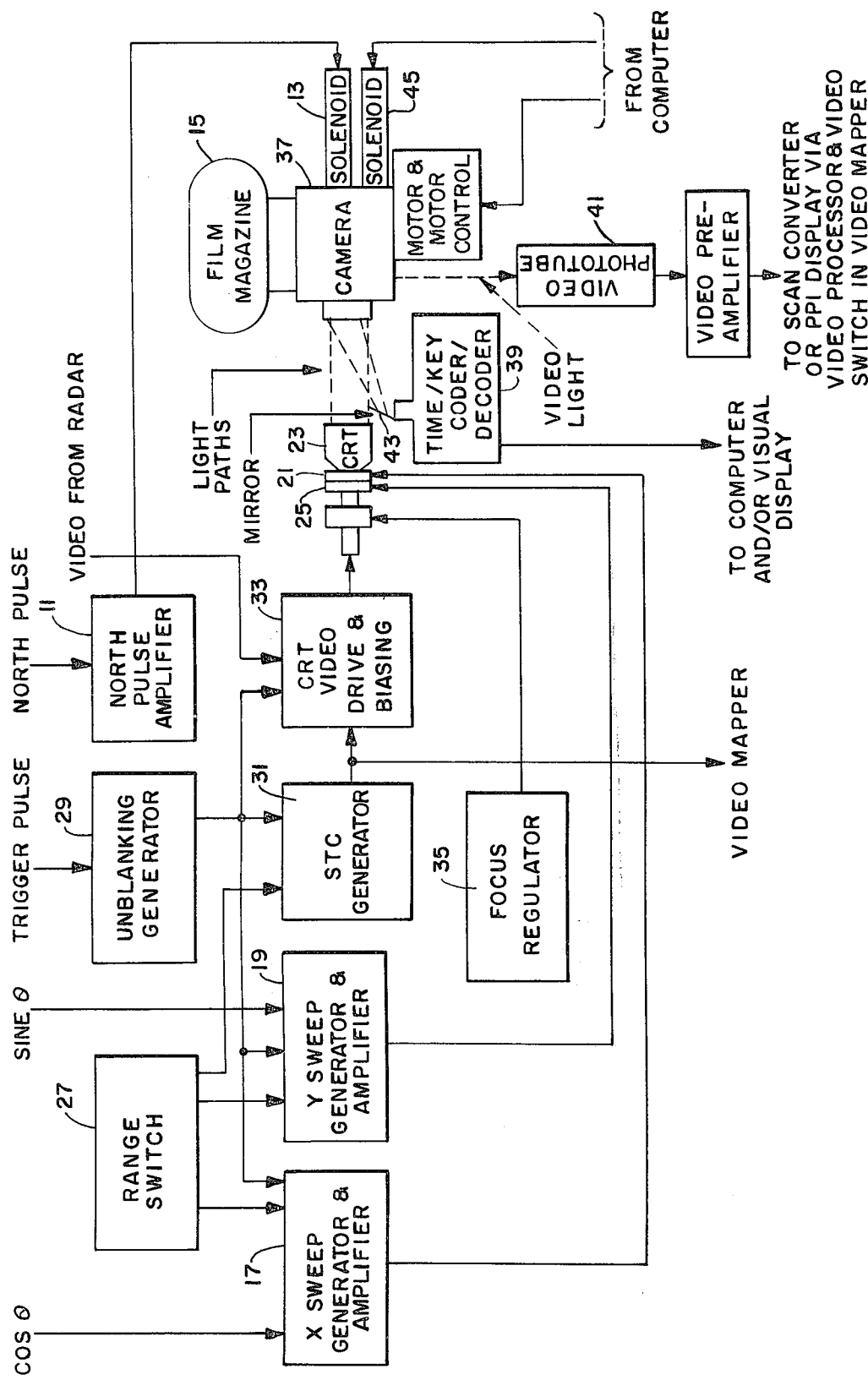

RADAR RECORDER SYSTEM

BACKGROUND OF THE INVENTION

This invention relates to a method and apparatus for recording and replaying information presented by a cathode ray tube.

In radar systems for controlling air traffic or studying weather movements, the information received via the radar system is temporarily viewed after which the information is lost forever. In such systems no provision is made for recording the radar information so that flight patterns or cloud formations can be studied in detail. For example, personnel studying to become air traffic controllers can familiarize thoroughly with prior dangerous air traffic situations where with an accident or near accident might have occurred. It is in these such emergency situations where students can learn how the situations developed and what measures could have been taken to prevent them from occurring.

As a second example, meteorologists studying cloud formations and weather movements have no way of examining past cloud formations as displayed on a radar system since radar systems provide only a temporary display at each instant of time.

In the past, radar displays have been recorded on magnetic tape by scanning the face of a cathode ray tube such as by known flying-spot scanning techniques and converting the sensed variations in light intensity to an electrical signal. The electrical signal was then coupled to a tape recorder for recording on a tape. Typically, two channels of information were required, one including the video information derived from the radar display and the other including reference and synchronization information in addition to identifying data such as time and location. In order to play back the information, fairly elaborate equipment was required so that the recorded signal can be reconstructed for presentation on a cathode ray tube. In addition, such recording systems did not permit stop-motion viewing of a radar scan which is often desirable. Accordingly, there is a need for a method and apparatus for recording and replaying the display of a radar system in a simplified manner wherein the system is capable of stop-motion display of a particular radar scan.

SHORT STATEMENT OF THE INVENTION

Accordingly, this invention relates to a radar recording system comprising a cathode ray tube for displaying a received radar signal A motion picture camera is positioned opposite the face of the cathode ray tube and means are provided for advancing the film in synchronism with the radar signal displayed on the cathode ray tube. A coder is provided for directing identifying information onto a portion of each frame of the film at the time the film is exposed to the radar display. The cathode ray tube has a long decay interval and the camera shutter and film advance is very fast. Accordingly, very little information is lost during each advance of the film.

A video phototube which converts the image recorded on the film to an electronic signal which may be utilized to provide a display on a planned position display indicator. A computer controls the advance of the film for replaying so that selected frames can be viewed during varying intervals of time.

BRIEF DESCRIPTION OF THE DRAWING

Other objects, features, and advantages of this invention will become more fully apparent from the following detailed description, the appended claims and accompanying drawing which is a schematic block diagram of the radar recorder.

DETAILED DESCRIPTION OF THE PREFERRED EMBODIMENT

Referring to the drawing there is shown the radar recording system of this invention which comprises a video signal, a synchronizationn signal, and a reference marker signal, each derived from a radar system (not shown). The radar system may be of any suitable type well known in the art for scanning targets such as airplanes or clouds. The marker signal is a simple pulse which is generated by the radar system each time the radar beam sweeps past a reference position such as the North azmuith. This signal is amplified in amplifier 11, the output of which is connected to a solenoid 13 which when energized advances the film in magazine 15 one frame.

the synchronization input from the radar system is preresolved into sine and cosine components by a suitable well-known resolver such as a sine-cosine potentiometer. The cosine function represents the radar beam position with respect to the X-axis and the sine function represents the beam position with respect to the Y-axis as the radar beam scans about a 360° angle. These two signals are coupled to an X-axis sweep generator 17 and a Y-axis sweep generator 19, respectively. The sweep generator 17 provides a ramp signal which is modulated by the cosine function of the beam sweep. This signal is connected to the X-axis coil 21 of cathode ray tube (CRT) 23. The Y-axis sweep generator 19 provides a ramp signal which is utilized to drive the Y-axis coil 25 of CRT 23. Thus, as the radar antenna sweeps through a 360° angle, the spot on the face of the CRT is deflected in a rho-theta ($\rho$–$\theta$) raster in synchronism with the radar antenna. A range switch 27 varies the slope of the X and Y sweep signals in accordance with the radar ramp being scanned. Hence, as the sweep ramp increases, the slope of the sweep signal decreases and vice versa.

A trigger pulse is generated just before the radar sweep is to begin. This pulse triggers the unblanking generator 29 which generates a signal for turning the CRT 23 on and off. Thus, when the spot on the face of the CRT is to be retraced, a blanking signal is generated and when a new trace or sweep begins the blanking signal is removed. The output of the unblanking generator is coupled to a sensitivity time control circuit (STC) 31. The STC automatically adjusts the intensity of the cathode ray tube trace so that the intensity of the display is the same at all points on the face of the cathode ray tube. The output of STC generator 31 is connected to a video amplifier 33 which provides both a video drive and a biasing signal to the cathode of the CRT 23. The video signal derived from the radar system is so coupled to CRT 23.

In order to provide a sharp and distinct display on the face of the CRT 23, a focus regulator 35 is provided which adjusts the width of the electron beam which impinges on the internal face of the CRT. In addition, in order to provide a display on the scope which is not lost during the time that the camera shutter is in operation, the phosphor material coating the internal face of the CRT should have a long decay period.

For example a 2 second decay time would be suitable if the motion picture camera 37 had a rapid film advance and shutter operation of less than 10 milliseconds total. Thus, when the camera shutter is closed and the film is advancing, the shutter opening of 10 milliseconds is very small compared to the 2 seconds decay time of the phosphor on the CRT. Hence, very little information is lost during this film advance interval.

The camera 37 is positioned with its shutter opening opposite the face of the cathode ray tube 23 such that light generated by the electron beam in the tube is directed into the shutter opening of the camera. A film magazine 15 containing a relatively long, e.g., 400 foot motion picture film is mounted on or in the camera for passing the film, frame by frame past the shutter opening. As aforementioned, the advance of the film is controlled by solenoid 13 which is energized once each time the radar antenna passes North. A coder 39 generates a signal in the form of a plurality of light rays which represent identifying data such as the time, place and operator identification. This signal information is directed onto a portion of the film being exposed by a mirror 43. Preferably, the mirror directs the coded identification data onto a corner of the film being exposed.

The camera action is somewhat similar to time lapse photography. If the radar antenna rotates at a rate of 20 R.P.M. it takes 3 seconds for one complete antenna revolution through a 360° angle. The camera film is therefore exposed for a 3 second interval. At the end of this time period, the shutter closes and the film advances one frame and the shutter then reopens thereby initiating another 3 seconds exposure period. The quantity of film required is directly proportional to the sweep rate of the radar antenna but it should be emphasized that even at fast antenna rates the quantity and size of film being used is substantially lower than the quantity and size of magnetic tape required for the same recording interval.

For the replay mode of operation, a video phototube 41 is provided which cooperates with camera 37 to generate an electrical signal containing the information recorded on the film. During the time that recorded film is being played back, no video radar signal is coupled to the cathode ray tube. Instead, the X and Y sweeps of the cathode ray beam scan across the face of the cathode ray tube in a manner similar to that of a flying-spot scanner. The light generated as the beam impinges upon the fluorescent face of the tube is directed into the camera where the lens thereof focuses the light on the developed film positioned in the camera. Of course, for this to occur the camera shutter may, in a conventional manner, be appropriately placed in the open position. The light passes through the clear areas of the film and onto a photo multiplier tube in the video phototube 41 where the light is converted into a video electronic signal. To perform this function, it is, of course, obvious that the video phototube 41 would be operatively connected to the camera in any conventional manner, such as by using a mirror or the like to enable light to be reflected from the camera after passing through the clear areas of the film.

Advance of the film in the camera may be controlled from an external force, such as, a computer, which selects the film frames to be replayed and the interval of time during which each frame is to be displayed. This iinformation from the computer is coupled to solenoid 45 which causes the camera to advance the film. As an alternative, the film in the camera could be advanced each time the rho-theta raster in the CRT passes a reference portion such as North. The raster passes true North and the solenoid is energized thereby causing the film to advance.

If a background map is to be superimposed onto the radar information, a transparency of the background map may be positioned in alignment with the recorded film such that the light passing from the cathode ray tube through the film will also pass through the transparency. This information is then converted by photo tube 41 into an electronic signal which may be then displayed on a planned position indicator.

While the invention has been described in connection with a preferred embodiment, it is not intended to limit the invention to the particular form set forth, but, on the contrary, it is intended to cover such alternatives, modification and equivalents as may be included within the spirit and scope of the invention as defined by the appended claims.

I claim:

1. A radar recording and video playback system comprising in combination cathode ray tube means for displaying a radar sweep signal, means receiving said radar signal for driving said cathode ray tube, a motion picture camera aligned opposite the face of the cathode ray tube, a film magazine mounted on said camera, undeveloped motion picture film mounted in said magazine for relative movement with respect to said camera, a solenoid means for advancing said undeveloped film in said camera, a frame of which advances each time said radar sweep completes rotation through a 360° angle, the face of said cathode ray tube having a long period phosphor decay substance thereon, said camera having a shutter with a rapid shutter speed for minimizing information loss for each advancement of the film, a coded means including a mirror for directing identification data onto a portion of the undeveloped film frame being exposed, the cathode ray tube having an electron beam which scans the face of said tube for producing a source of light, the motion picture film magazine including therein a developed motion picture film substituted for the undeveloped film, and a video phototube means for directing the light from the electron beam of the cathode ray tube through frames on said developed film in said camera onto said video phototube, whereby said camera has its shutter in a position which so enables the light to pass through the frames, said phototube converting video information on said developed film into a corresponding electrical signal, and means for advancing said developed film in said camera.

2. The radar recorder of claim 1 further comprising means for superimposing a signal representing an area map on said radar signal to thereby provide background identification information on the display of said cathode ray tube.

* * * * *